United States Patent [19]

Wier et al.

[11] 4,390,076
[45] Jun. 28, 1983

[54] INTEGRATED WHEELCHAIR AND AMBULATOR

[75] Inventors: John P. Wier; Robert A. Garrett, both of San Diego, Calif.

[73] Assignee: The United States of America as represented by the Secretary of the Navy, Washington, D.C.

[21] Appl. No.: 228,503

[22] Filed: Jan. 26, 1981

Related U.S. Application Data

[62] Division of Ser. No. 62,835, Aug. 1, 1979.

[51] Int. Cl.³ .............................................. B62D 51/00
[52] U.S. Cl. ................................. 180/11; 180/DIG. 3; 280/242 WC; 280/289 WC; 280/DIG. 10; 297/330; 297/DIG. 4; 297/DIG. 10
[58] Field of Search ............ 180/6.48, 6.5, 6.2, 180/7 R, 8 A, 65 R, 11–13, 14 R, DIG. 3; 280/5, 3, 47.38, 211, 242 WC, 289 WC, DIG. 10; 297/66, 71, 330, 347, 352, 417, 466, 45, DIG. 4, DIG. 10; 301/5 P; 296/65 R; 5/81 R, 86; 128/25 R

[56] References Cited

U.S. PATENT DOCUMENTS

| Re. 28,103 | 8/1974 | Schwartz et al. | 128/25 R |
| 2,849,051 | 8/1958 | Streeter | 5/81 R X |
| 3,100,547 | 8/1963 | Rosenthal | 180/6.5 |
| 3,351,148 | 11/1967 | Solomon | 180/6.5 |
| 3,688,857 | 9/1972 | Miller | 180.6.5/ |
| 3,807,795 | 4/1974 | Weant et al. | 297/330 |
| 3,945,449 | 3/1976 | Ostrow | 180/6.5 |
| 4,054,319 | 10/1977 | Fogg, Jr. et al. | 297/353 X |
| 4,067,249 | 1/1978 | Deucher | 297/330 |
| 4,076,304 | 2/1978 | Deucher | 297/45 |
| 4,119,164 | 10/1978 | Fogg, Jr. et al. | 180/6.5 |
| 4,258,815 | 3/1981 | Wier et al. | 180/6.48 |

Primary Examiner—Joseph F. Peters, Jr.
Assistant Examiner—Mitchell J. Hill
Attorney, Agent, or Firm—Robert F. Beers; Ervin F. Johnston; Terrance A. Meador

[57] ABSTRACT

An integrated ambulator and wheelchair is provided to enable a paraplegic to stand on the ambulator and be separated from the wheelchair for maneuvering in confined spaces. The ambulator has power operated articulated linkage for raising the paraplegic out of and free of the wheelchair to the standing position on the ambulator; the compact base of the ambulator containing a drive mechanism for moving the ambulator in any desired direction through controls conveniently located on an arm rest.

4 Claims, 3 Drawing Figures

INTEGRATED WHEELCHAIR AND AMBULATOR

CROSS REFERENCE TO RELATED APPLICATIONS

This is a division of application Ser. No. 62,835, filed 8/01/79.

This invention is related to U.S. Pat. No. 4,284,929, issued Aug. 18, 1981, entitled "Ambulator Control Circuitry" which is directed to the electrical control circuit for the ambulator drive mechanism; and to U.S. Pat. No. 4,258,815, issued Mar. 3, 1981, entitled "Ambulator Drive Mechanism" directed to the novel details of the ambulator drive mechanism.

BACKGROUND OF THE INVENTION

This invention relates to mobile equipment for a partially paralyzed person, and more particularly to such equipment that is more compact and highly maneuverable to enable work to be performed by the person in a standing position in confined spaces normally inaccessible by a wheelchair.

Numerous types of mobile equipment have been designed in an effort to accommodate the various needs for an orthopedically disabled person. Recently there has been a recognition of the need for equipment to elevate such a person from a horizontal or sitting position to a standing position. There are therapeutic and medical advantages for a paraplegic to be able to stand in an erect position. The ambulator will make it easier for the paraplegic to live in an environment where most functions are accomplished in an upright position, e.g. cooking at a range or working at a workbench or sink. However, the psychological benefit of the ability to converse at eye level may be the greatest benefit.

This type of equipment is best illustrated in U.S. Pat. No. 4,054,319 issued Oct. 18, 1977, for "Stand-Aid Wheelchair." In that patented equipment the raising and lowering linkage for the paraplegic is made an integral part of the wheelchair. Although this wheelchair supported the paraplegic in a standing position, because of its size is limited in accessibility to confined areas. In addition, because the linkage is not coordinated with the articulated joints of the occupant's body, it was necessary in the patented equipment to use a narrow flexible lifting strap for raising the person off the wheelchair seat to minimize friction that will displace the person's clothing during the relative movement. For a similar reason, a backrest was necessarily designed to be reciprocable to move with the clothes on the person's back during the raising and lowering operations.

In U.S. Pat. No. Re 28,103 issued Aug. 6, 1974, entitled "Invalid Mobility Bench" a pair of Farnham-type crutches are anchored on individually movable base carriages which support each foot of the invalid. Each crutch is telescopically power-operated for lifting and lowering the invalid supported therebetween on a fabric sling. The motor in each base carriage is individually controlled by the invalid at the hand grip of each crutch to simulate a walking gait.

SUMMARY OF THE INVENTION

The combination of a wheelchair and a separable mating ambulator offers numerous advantages over prior art devices. The ambulator is provided with a linkage mechanism for raising and lowering the paraplegic frame from and to the wheelchair. With the paraplegic supported by the linkage in a standing position on the ambulator platform, the ambulator can be detached from the wheelchair and easily maneuvered by the paraplegic in and around confined spaces not possible by the conventional prior art wheelchair. The linkage is provided with armrests which are articulated to remain in a substantially horizontal position throughout the raising and lowering operations providing the paraplegic with lateral support, which enhances his confidence in the equipment and his ability to accomplish his tasks. The armrest also provides a convenient location for a joy stick for controlling the steering of the ambulator drive mechanism, as well as a separate control for the raising and lowering linkage.

The novel adjustable linkage is pivotable at the vicinity of both the knees and hip joints of the user so that there is no substantially relative movement between the ambulator seat and backrest, and the clothes of the paraplegic during the raising and lowering movements that would otherwise dishevel the clothes and be a source of annoyance to the paraplegic.

OBJECTS OF THE INVENTION

One object of this invention is to provide an integrated ambulator and wheelchair wherein the ambulator can be readily separated to movably support a paraplegic in a standing position.

Another object of this invention is to provide a small and compact ambulator capable of maneuvering in confined spaces with increased mobility and accessibility.

Still another object is to provide an adjustable raising and lowering linkage mechanism for the ambulator that will not cause the clothes of the paraplegic to be disheveled during the raising and lowering movements with the wheelchair.

DESCRIPTION OF A PREFERRED EMBODIMENT

Figure 1:
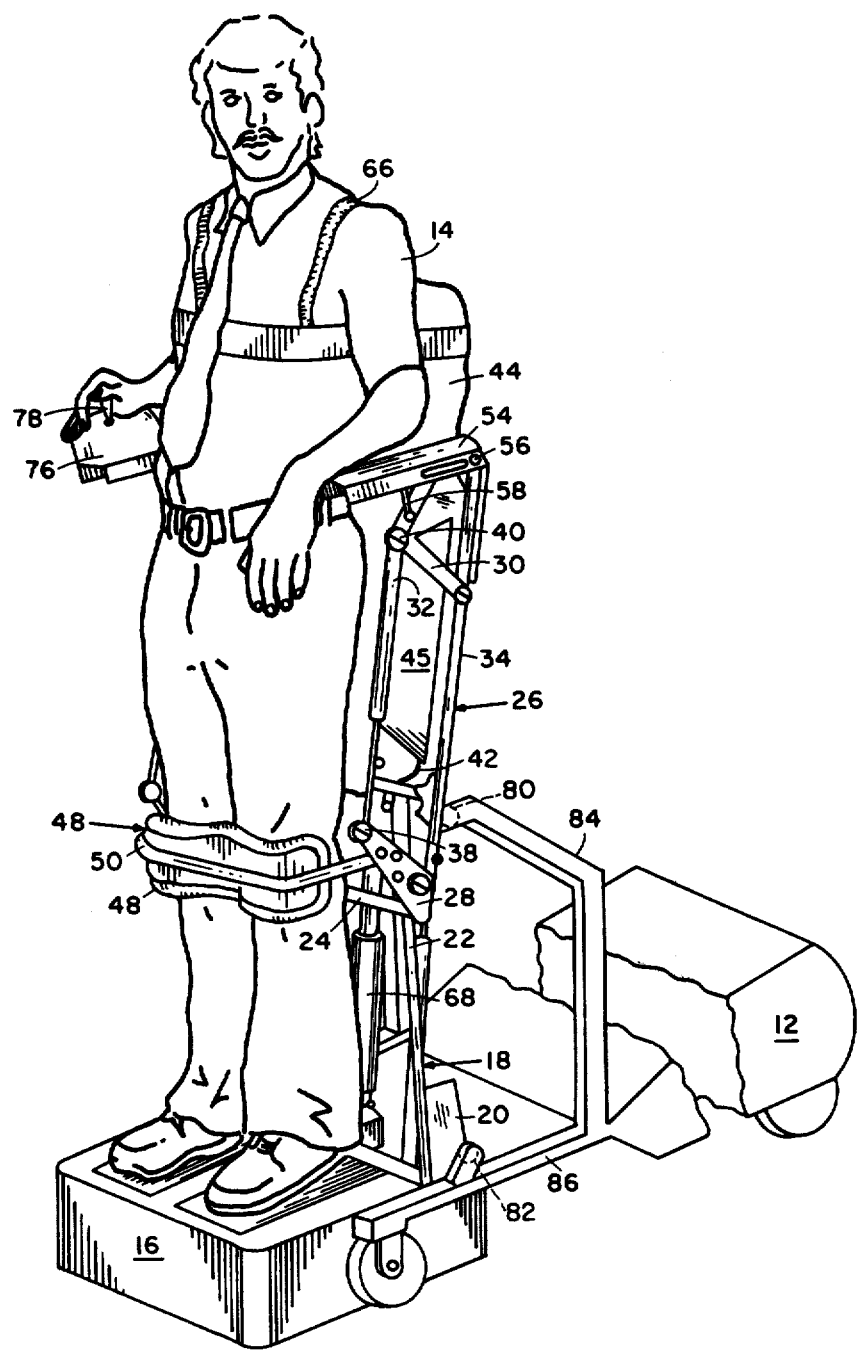
FIG. 1 is a side perspective view of a paraplegic being supported in a standing position on the ambulator shown separated from the integrated wheelchair.
Figure 2:
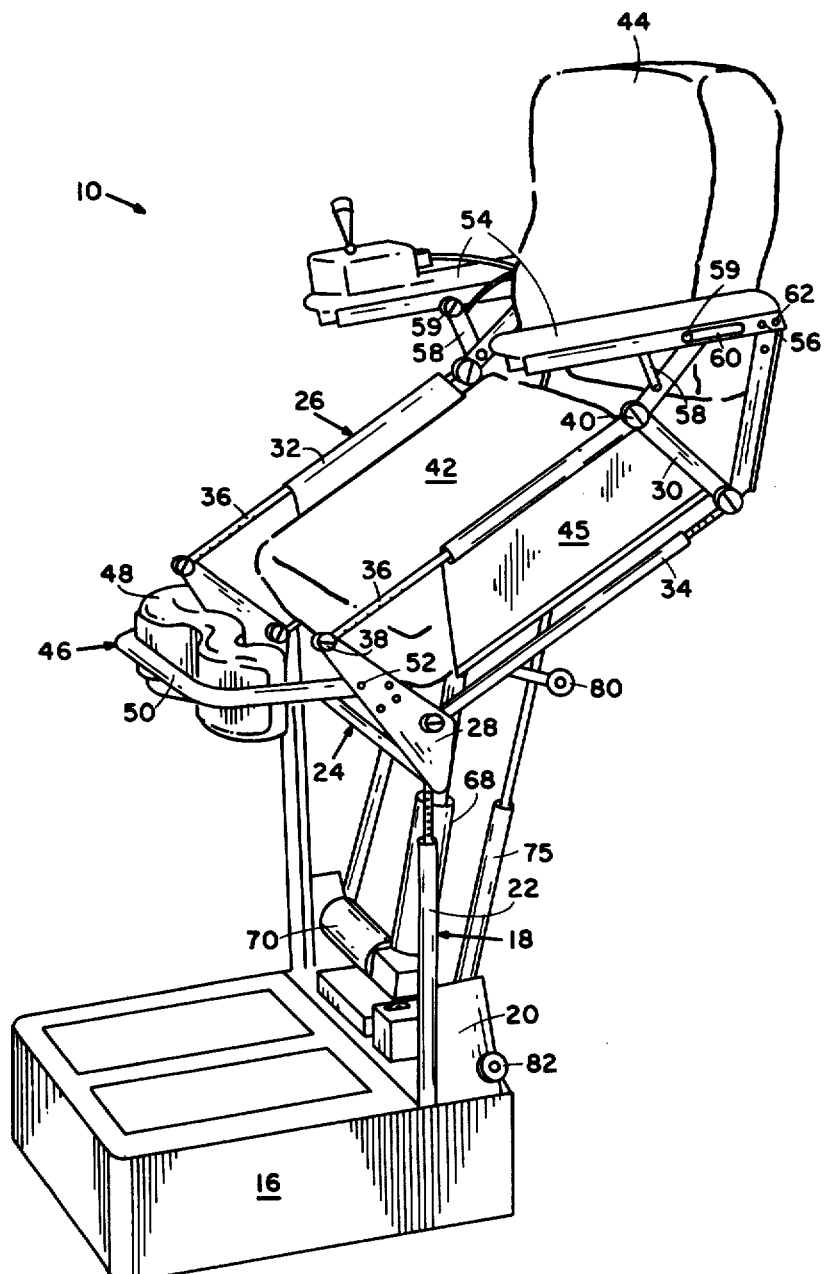
FIG. 2 is a side perspective view of the ambulator with the linkage in a midway position between the upright and lowered positions.
Figure 3:
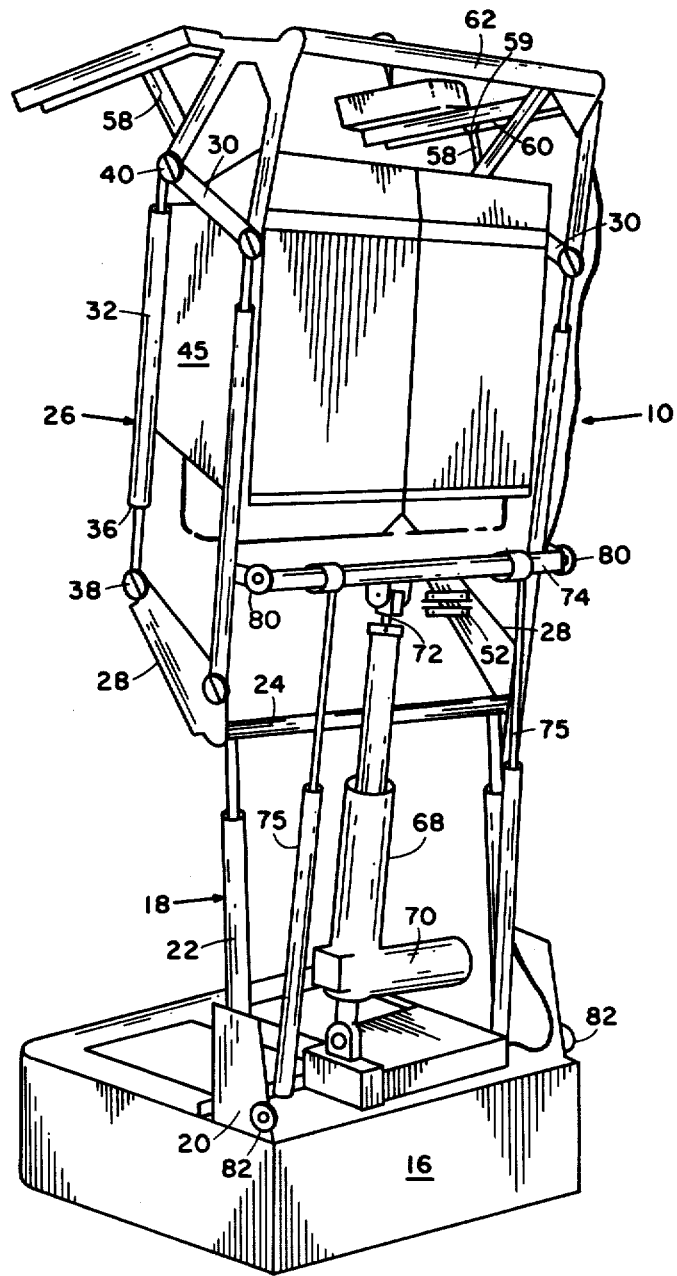
FIG. 3 is a rear view of the ambulator in an upright position.

Referring to the drawings where like reference numerals refer to similar parts, there is in FIG. 1 an ambulator 10 shown in a separated position from its integrated base wheelchair 12 for supporting a paraplegic 14 in a standing position. The manner in which the ambulator and wheelchair are separably connected will be described later.

Ambulator 10 comprises a small base 16 which houses a unique drive mechanism the details being described in Applicants' above identified patent application. An inverted U-shape tubular frame 18 is welded to base 16 by knee plates 20, the upright frame members 22 being shown telescopically constructed to be adjustable in height for a reason to be explained. Journaled on opposite ends of the frame crosspiece 24 is an articulated linkage system 26 which supports all of the remaining ambulator components.

Linkage system 26 comprises two sets of links formed generally in a parallelogram configuration, one set on each side of the ambulator. Each set of links includes a pair of forward and rearward end links 28 and 30, respectively, hinged at their ends to a pair of upper and lower side links 32 and 34, respectively, the latter pair of links being constructed to be telescopically adjustable in length at 36.

An improvement feature of this invention resides in locating the forward pivot points 38 and 40 of the linkage substantially aligned horizontally with the knee and hip joints, respectively, of the paraplegic that will use the ambulator. This arrangement of the linkage minimizes the relative movement between the paraplegic's clothing in contact with an ambulator seat 42 and a back support 44 during the raising and lowering movements. Without this novel arrangement, the paraplegic's clothing will be disheveled by any significant relative movement of his body with the seat and backrest and be a source of annoyance and discomfort. Seat 42 is secured within a U-shaped channel member 45 suspended from upper links 32.

To achieve this object, uprights 22 and upper and lower links 32 and 34 are made telescopically adjustable in length, as previously described, to enable the linkage to be tailored to the specific body dimensions of the paraplegic using the ambulator.

The paraplegic's legs are laterally supported by a knee restraint 46 comprising a set of concave pads 48, one for each lower leg, fixed on a U-shaped bracket 50, the ends of the bracket being slidably mounted to guides 52 on both end links 28. With this construction, knee restraint 46 follows the forward and rearward movement of the legs during the raising and lowering of the linkage.

The upper torso of the paraplegic is supported laterally on a pair of armrests 54 hinged at 56 to the upper end of link 30 which has a bellcrank configuration. A brace 58 is pivoted at one end to each link 30 and the other end has a roller 59 confined in armrest slot 60 to provide intermediate support to the armrests to maintain them in a substantially horizontal orientation throughout the raising and lowering of linkage 26.

A spreader rod 62 is bracketed at both ends to the upper ends of bellcranks 30, and to which is riveted the upholstered backrest 44. As shown in FIG. 1, a chest and shoulder strap assembly 66 may be provided to support the upper torso of the paraplegic against the backrest.

The ambulator linkage is raised and lowered by a jacking screw 68 driven by a DC motor 70, the latter being pivoted at its bottom end to ambulator base 16. The upper end of screw 68 is pivoted at 72 to a U-shaped crosspiece 74 welded at each of its ends to an intermediate point on lower links 34. A pair of self-contained telescopic gas springs 75, one on each side of jacking screw 68, are also pivoted at the lower ends to base 16 and at their upper ends to crosspiece 74 to smooth out the raising and lowering movements by jackscrew 68.

A manual switch 76, for controlling raising and lowering motor 70, is conveniently located on either the left hand or right hand armrest 54, as is the joy stick switch 78 for controlling the ambulator drive mechanism.

The ambulator is designed to be mated to wheelchair 12 by a pair of upper and lower rollers 80 and 82, respectively. Upper rollers 80 are each welded to one side of link 34, and lower rollers 82 are each mounted to knee plates 20. Upper rollers 80 are positioned to slide into upper guide rails 84 of the wheelchair, and lower rollers 82 are designed to slide into lower guide rails 86 of the wheelchair. Upper and lower guide rails are configured so that the lowering of the ambulator linkage by jacking screw 68 will cause the respective rollers by engagement with the guide rails to lift ambulator base 16 several inches off the floor when the ambulator is fully nested into the wheelchair. This provision will enable the wheelchair to be maneuvered by its own drive mechanism independent of the ambulator. A switch 88 on the ambulator when automatically engaged with switch 90 on the wheelchair when mated transfers joy stick 78 control from the ambulator drive mechanism to the wheelchair drive mechanism.

The ambulator/wheelchair combination of this invention offers a practical and versatile solution to the problem of obtaining greater accessibility to confined areas by the paraplegic to accomplish a variety of tasks without the presence of a cumbersome wheelchair. The ability of a paraplegic to be able to move around in a stable standing position is of medical importance in that it stresses his bone structure and improves circulation. Thus the novel equipment improves the paraplegic's health, as well as providing a psychological feeling of well being. The ambulator provides the paraplegic with a high degree of maneuverability to accomplish a plurality of tasks. When the paraplegic no longer requires the ambulator he can reunite it with the wheelchair, utilizing the integrated structure as a conventional wheelchair.

Obviously, many other modifications and variations of the present invention are possible in the light of the above teachings. It is therefore to be understood that within the scope of the appended claims the invention may be practiced otherwise than as specifically described.

What is claimed is:

1. An integrated separable ambulator and wheelchair comprising:
   the ambulator including:
      a base which is capable of resting on a floor and supporting a person's feet;
      a seat;
      a framework of articulated linkage mounted on the base for supporting the seat between horizontal and vertical positions;
      means for selectively moving the seat between the horizontal and vertical positions so that a person can be supported between sitting and standing positions respectively;
      said ambulator and wheelchair having mating connecting means when the seat is in a vertical position; and
      means for lifting the base clear of the floor when the ambulator and wheelchair are mated so as to enable the wheelchair to be maneuvered with the ambulator supported thereon.

2. The integrated separable ambulator and wheelchair of claim 1 wherein said means for lifting the base includes the means for selectively moving the seat.

3. An integrated separable ambulator and wheelchair comprising:
   the ambulator including:
      a base which is capable of resting on the floor and supporting a person's feet;
      a seat;
      a framework of articulated linkage mounted on the base for supporting the seat between horizontal and vertical positions; and means for selectively moving the seat between the horizontal and vertical positions so that a person can be supported between sitting and standing positions respectively;

said ambulator and wheelchair having mating connecting means when the ambulator is in a vertical position, said mating connecting means including:

the wheelchair having a pair of upper and lower guide rails;

a pair of upper rollers mounted on the linkage for engaging the pair of upper guide rails; and a pair of lower rollers mounted on the base for engaging the pair of lower guide rails; and the means for selectively moving the seat also for lifting the base clear of the floor when the ambulator and wheelchair are mated so as to enable the wheelchair to be maneuvered with the ambulator supported thereon.

4. The integrated separable ambulator and wheelchair of claim 3 wherein the means for selectively moving the seat also raises and lowers the base after the upper rollers engage the upper guide rails.

* * * * *